(12) United States Patent
Bresney (10) Patent No.: US 8,129,876 B2
(45) Date of Patent: Mar. 6, 2012

(54) BRAZED JOINT BETWEEN A COOLING FLUID BOX AND AN ARMATURE BAR

(76) Inventor: Michael Bresney, Amsterdam, NY (US)

( * ) Notice: Subject to any disclaimer, the term of this patent is extended or adjusted under 35 U.S.C. 154(b) by 278 days.

(21) Appl. No.: 12/701,982

(22) Filed: Feb. 8, 2010

(65) Prior Publication Data
US 2011/0194891 A1     Aug. 11, 2011

(51) Int. Cl.
*H02K 9/00* (2006.01)
(52) U.S. Cl. ............................. 310/54; 29/596
(58) Field of Classification Search ............ 310/270, 310/271, 52, 54, 64; 288/245; 29/596
See application file for complete search history.

(56) References Cited

U.S. PATENT DOCUMENTS

| | | | |
|---|---|---|---|
| 2,980,757 A | 4/1961 | Coggeshall et al. | |
| 3,955,110 A | 5/1976 | Karlen | |
| 4,258,939 A | 3/1981 | Karlen | |
| 4,629,917 A * | 12/1986 | Brem | 310/59 |
| 5,581,869 A * | 12/1996 | Travaly | 29/596 |
| 5,616,040 A | 4/1997 | Taillon et al. | |
| 5,793,014 A | 8/1998 | Sobkowiak et al. | |
| 6,633,097 B2 | 10/2003 | Dunlap et al. | |
| 6,784,573 B1 * | 8/2004 | Iversen et al. | 310/52 |
| 6,911,759 B2 | 6/2005 | Kalsi | |
| 7,088,020 B2 * | 8/2006 | Holly et al. | 310/52 |
| 7,216,796 B2 * | 5/2007 | Breznak et al. | 228/245 |
| 7,219,827 B2 * | 5/2007 | Breznak et al. | 228/245 |
| 7,321,179 B2 * | 1/2008 | Ward et al. | 310/260 |
| 7,334,316 B2 | 2/2008 | Wang et al. | |
| 7,405,379 B2 | 7/2008 | Breznak et al. | |

\* cited by examiner

*Primary Examiner* — Nguyen N Hanh
(74) *Attorney, Agent, or Firm* — Burr & Brown (57) ABSTRACT

A brazed joint between a cooling fluid box and an armature bar can comprise a cooling fluid box, a plurality of conductor strands, at least one side wall spacer, and at least one middle spacer. Each side wall spacer can have a tapered width and can be wedged between the plurality of conductor strands and an interior side wall of the cooling fluid box. Each middle spacer can have a tapered width and can be wedged between two columns of the conductor strands. The side wall spacers can taper in a direction opposite the taper of the middle spacers. In one embodiment, the cooling fluid box can move around the conductor strands. Each side wall spacer can be positioned against an interior surface of the cooling fluid box. Each middle spacer can be positioned between columns of conductor strands. The cooling fluid box can be withdrawn to a final position.

20 Claims, 5 Drawing Sheets

BRAZED JOINT BETWEEN A COOLING FLUID BOX AND AN ARMATURE BAR

FIELD OF THE INVENTION

This invention relates generally to a cooling fluid box for a generator or an alternator, and more particularly, to a brazed joint between a cooling fluid box and an armature bar of the generator or the alternator, and a method of assembling the joint.

BACKGROUND OF THE INVENTION

An armature of a high-powered generator or alternator is comprised of a set of bars, called armature bars, which obtain extremely high electrical current densities, and therefore, high temperatures. These armature bars are generally cooled with a coolant circulating inside the bars. The coolant is traditionally water, often deionized, but other coolants can be used in liquid or gaseous form, such as oil, hydrogen, nitrogen, oxygen, argon, helium, krupton, methane, air, or another fluid.

A fluid-cooled armature bar is comprised of a plurality of rectangular, solid, conductor strands and a plurality of hollow conductor strands. These solid conductor strands and hollow conductor strands are arranged to form a bar. The rectangular conductor strands are generally arranged or stacked in columns or rows, with the hollow conductor strands interspaced among the solid conductor strands. The hollow conductor strands each have an internal duct for conducting coolant through the armature bar.

Each armature bar extremity ends at a cooling fluid box which acts as a reservoir for the cooling fluid, and which links with other elements of the cooling circuit. A cooling fluid box can also be referred to as a "hydraulic clip", "clip", "header", "end fitting", "water box", or another variation of these terms. The connection between each bar and its associated cooling fluid box is intended to be impervious to prevent the cooling fluid from leaking between the outside and inside of the cooling fluid box since leaks can result in isolation defects and corrosion problems.

To make the junction between the armature bar end and the cooling fluid box impervious to cooling fluid leaks, the end of the armature bar is brazed to the cooling fluid box. At one open end, the cooling fluid box encloses the ends of the conductor strands of one end of the armature bar, and a braze alloy bonds the end of each conductor strand to the neighboring conductor strand(s) and/or to the neighboring surface(s) of the cooling fluid box. The brazed joints between the adjacent conductor strands, and the brazed joints between the conductor strands and the cooling fluid box should retain electrical integrity while providing a fluid-tight barrier.

To braze, the hollow and solid conductor strand ends are assembled in stacks and positioned within the cooling fluid box. Braze alloy is then melted and wicked into voids or gaps during induction heating. The braze alloy spreads, bridging from surface to surface to fill the gaps through capillary action, which is increasingly effective as the distance between surfaces (i.e. the breadth of the gaps) decreases. For instance, a gap distance of 0.001 inches (≈0.0025 cm) to 0.003 inches (≈0.0076 cm) allows for an effective brazing and a strong brazed joint. With a gap distance of 0.003 inches (≈0.0076 cm) to 0.005 inches (≈0.0127 cm), the braze alloy can still properly bridge the gaps, but with less reliability than with a gap distance of 0.001 inches (≈0.0025 cm) to 0.003 inches (≈0.0076 cm). A gap distance of more than 0.005 inches (≈0.0127 cm) can result in a weak braze joint, as the braze alloy will likely not bridge the gaps well to fill all the spaces. With the importance of providing a leak free, fluid-tight, electrically intact joint, it is beneficial to assemble the conductor strands to be jointed to the cooling fluid box with minimal space between each conductor strand, and between the strands and the cooling fluid box, so that a strong braze can be achieved.

Because the conductor strands are not perfectly rectangular, but rather are rounded to some degree on the corners, when the strands are grouped together to form a bar, large gaps can remain where the corners of four conductor strands meet. To lessen the gaps, it is beneficial to secure the conductor strands in place tightly where the conductor strands will be brazed to the cooling fluid box. A tight fit also reduces the chance of movement during brazing. Movement of the conductor strands with respect to each other, or with respect to the cooling fluid box during brazing can also cause less durable and less structurally sound joints that are less impervious to leaking.

Achieving this tight fit to avoid a weak braze joint can be difficult, especially while simultaneously establishing proper alignment and position of the conductor strands in the cooling fluid box. To slide the cooling fluid box around the armature bar in preparation for brazing, there must be adequate physical clearance between the interior opening of the cooling fluid box and the perimeter of the armature bar. Providing this clearance reduces the tightness of the fit. Columns of conductor strands making up the armature bar do not squeeze tightly together to reduce or eliminate gaps. Therefore, in designing sufficient clearance, large gap distances are inherently designed into the assembly as well. These gap distances exceed 0.005 inches (≈0.0127 cm), which do not fill well by capillary action during brazing.

On the other hand, to achieve a tighter fit, it can be beneficial to dimension the armature bar larger than the opening of the cooling fluid box into which the armature bar will be fit. However, pressing the armature bar into an area smaller than the armature bar presents difficulty. Under present methods of assembling the armature bar to be brazed within the cooling fluid box, a tight fit of the armature bar and its individual conductor strands inside the cooling fluid box is difficult to achieve, allowing large gaps that are difficult to fill during brazing. The brazed joints, as a result, are not as strong, not as durable, and not as impervious to leaking.

It would be advantageous to provide an easier assembly method and an apparatus to firmly secure the conductor strands in position during the brazing procedure. It would also be advantageous to provide an easier assembly method and an apparatus to reduce the gap sizes between the strands, and between the strands and the cooling fluid box.

SUMMARY OF THE INVENTION

In one embodiment of the invention, a brazed joint between a cooling fluid box and an armature bar is provided. In one embodiment, the brazed joint can comprise a cooling fluid box, a plurality of conductor strands, at least one side wall spacer, and at least one middle spacer can be provided. The cooling fluid box can have an inboard end and an outboard end. The plurality of conductor strands can extend into the cooling fluid box from the inboard end. Each side wall spacer can have a tapered width and can be wedged between the plurality of conductor strands and a side wall of the cooling fluid box so the tapered width tapers in a direction from the inboard end of the cooling fluid box toward the outboard end of the cooling fluid box. Each middle spacer also can have a tapered width. Each middle spacer can be wedged between two columns of the plurality of conductor strands so the tapered width of each middle spacer tapers in a direction from the outboard end of the cooling fluid box toward the inboard end of the cooling fluid box.

In another embodiment of the invention, a method of forming a brazed joint between an armature bar and a cooling fluid box is provided. In one embodiment, the method can comprise moving the cooling fluid box with respect to a plurality of conductor strands around the plurality of conductor strands so the plurality of conductor strands enters through a first end of the cooling fluid box, positioning at least one tapered side wall spacer against at least one interior surface of the cooling fluid box, positioning at least one tapered middle spacer between at least two conductor strands from the plurality of conductor strands, and withdrawing the cooling fluid box and the at least one tapered side wall spacer with respect to the plurality of conductor strands to a final position at which the plurality of conductor strands, the at least one middle spacer, and the at least one side wall spacer are wedged between the at least one interior surface and at least one opposing interior surface of the cooling fluid box opposite the at least one interior surface.

DETAILED DESCRIPTION OF THE INVENTION

Figure 1:
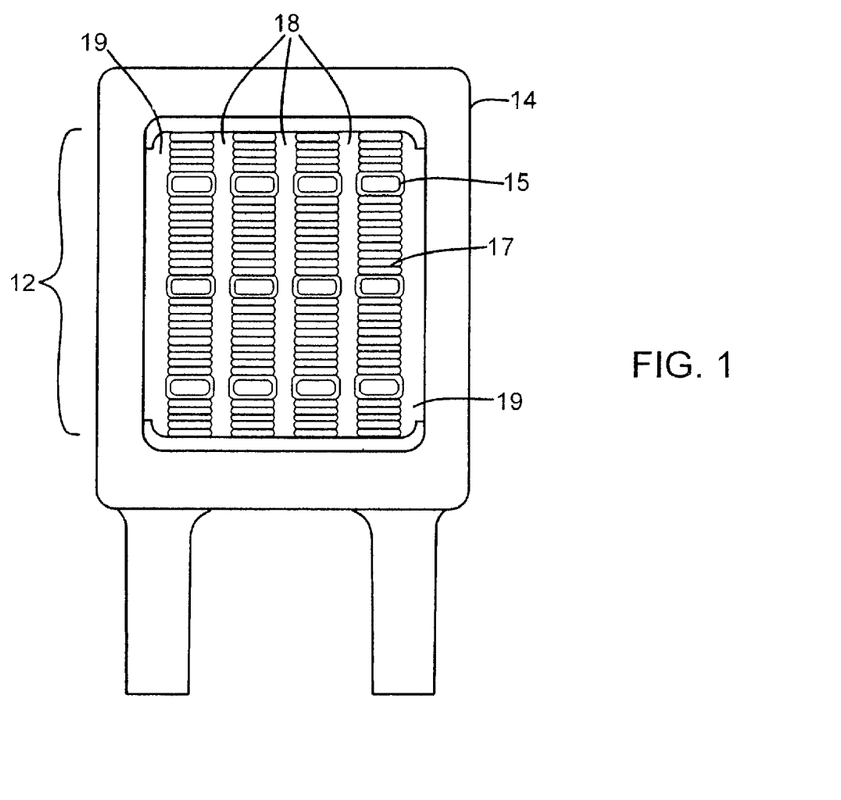
FIG. 1 is a front view of an armature bar end attached to a cooling fluid box using spacers in one exemplary embodiment of the invention.

FIG. 1 depicts a front view of an armature bar 12 brazed to a cooling fluid box 14 using middle spacers 18 and side wall spacers 19 in one exemplary embodiment of the invention.

The armature bar 12 can be formed of hollow conductor strands 15, used in circulating a cooling fluid, and/or solid conductor strands 17. The conductor strands 15, 17 can be rectangular in shape, as illustrated and commonly used in the art. The hollow conductor strands 15 can be larger than the solid conductor strands 17 in at least one dimension, so that the hollow conductors 15 can have a hollow area in which the cooling fluid can travel, and strong and durably thick walls. The invention can be modified accordingly if a conductor strand 15, 17 with a shape other than rectangular is used to form the armature bar 12.

Figure 2:
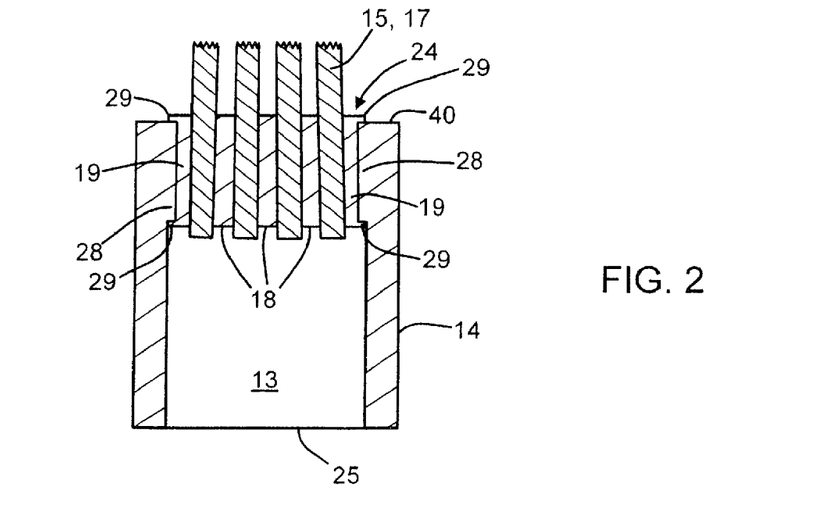
FIG. 2 is a cross-sectional top view of the exemplary embodiment illustrated in FIG. 1.

FIG. 2 is a cross-sectional top view of the exemplary embodiment illustrated in FIG. 1. Referring to FIG. 2, the conductor strands 15, 17 enter and end inside one end of the cooling fluid box 14, which is an inboard end 24. The conductor strands 15, 17 form a wall enclosing the inboard end 24, while a cavity 13 is formed inside the cooling fluid box 14, with one opening on the end of the cooling fluid box 14 opposite the conductor strands 15, 17. The open end is an outboard end 25. While the outboard end 25 of the cooling fluid box 14 is depicted and described as open throughout this description, the outboard end 25 of the cooling fluid box 14 can be closed, for instance, by another device, part, or structure. For instance, the cooling fluid box 14 can be connected to further cooling or hydraulic components, such as by capping the outboard end 25 with a clip cap (not shown), and connecting the clip cap to further piping (not shown) by a nipple (not shown).

Still referring to FIG. 2, middle spacers 18 and side wall spacers 19 can be used to separate groups of conductor strands 15, 17, to make the fit of the end of the armature bar 12 tighter, and to enable a better braze by reducing the number or size of gaps and voids. Middle spacers 18 can be positioned between columns of conductor strands 15, 17, and side wall spacers 19 can be positioned between a side wall of the cooling fluid box 12 and the conductor strands 15, 17.

The side wall spacers 19 can have a taper. A width of each side wall spacer 19 can taper over at least a portion of one length which extends from the end of the side wall spacer 19 oriented toward the inboard end 24 of the cooling fluid box 14 to the end of the side wall spacer 19 oriented toward the outboard end 25 of the cooling fluid box 14. In other words, the side wall spacers 19 each form a wedge with the narrower end toward the outboard end 25 and the wider end extending out of or toward the inboard end 24.

The middle spacers 18 can also have a taper. A width of each middle spacer 18 can taper over at least a portion of one length oriented in an opposite direction to that of the side wall spacers 19. The middle spacers 18 can taper in a direction moving along the length of the conductor strands 15, 17 from the outboard end 25 toward the inboard end 24. In other words, the middle spacers 18 each form a wedge with the narrower end toward or extending from the inboard end 24, and the wider end toward the outboard end 25.

A taper angle of the spacers 18, 19 can be measured between the two generally opposing, nonparallel surfaces that define the tapered width, in a plane substantially parallel to the tapered surfaces which connect the generally opposing, nonparallel surfaces (e.g. parallel to the top and bottom of the cooling fluid box 14). This taper angle can be small in order to reduce the amount of physical stress applied on the conductor strands 15, 17, to help maintain the parallel configuration of the conductor strands 15, 17, and/or to reduce bending of the conductor strands 15, 17.

In one exemplary embodiment, in order to reduce stress on the conductor strands 15, 17, to help maintain the parallel configuration of the conductor strands 15, 17, to uniformly distribute stress on the conductor strands 15, 17, and/or to reduce bending of the conductor strands 15, 17, a summation of the taper angles of all the middle spacers 18 can equal or approximately equal a summation of the taper angles of all the side wall spacers 19. For instance, if all the spacers 18, 19 have the same length in the tapered direction, then the total taper, if all the spacers 18, 19 are put together into a single block, can be zero or approximately zero.

In one exemplary embodiment, using two side wall spacers 19 and three middle spacers 18, the side wall spacers 19 are each tapered at a 1.5 degree angle. The total of the taper angles for the side wall spacers 19 is 3.0. The sum of the taper angles of the middle spacers 18, then, can also total 3.0 degrees. The taper angle of each middle spacer 18 can equal 1.0 degrees. When the taper angles are equal, the stress on each column of conductor strands 18, 19 can be evenly spread out. Alternatively, each of the three middle spacers 18 can have a taper angled differently.

In another exemplary embodiment, the side wall spacers 19 have the greatest taper, with the middle spacers 18 at the periphery of the middle spacers 18 having a lesser taper, and the one or two middle spacers 18 centrally located amongst the other middle spacers 18 having the least amount of taper, perhaps with no taper. In one example, only the most peripheral middle spacers 18 have a taper.

Figure 3:
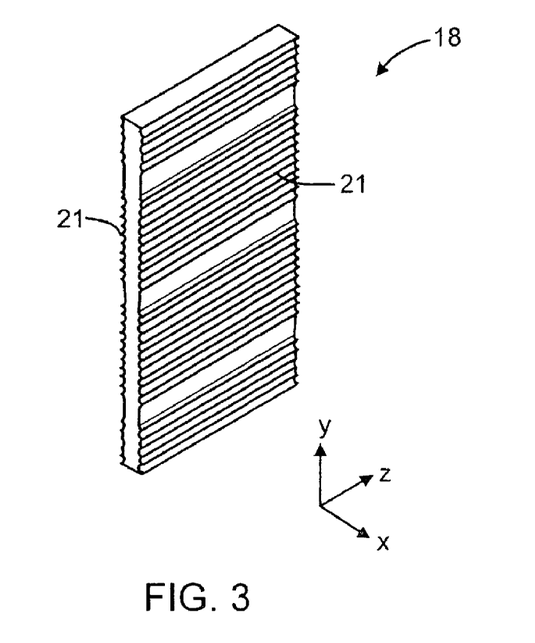
FIG. 3 illustrates a middle spacer in one exemplary embodiment of the invention.
Figure 4:
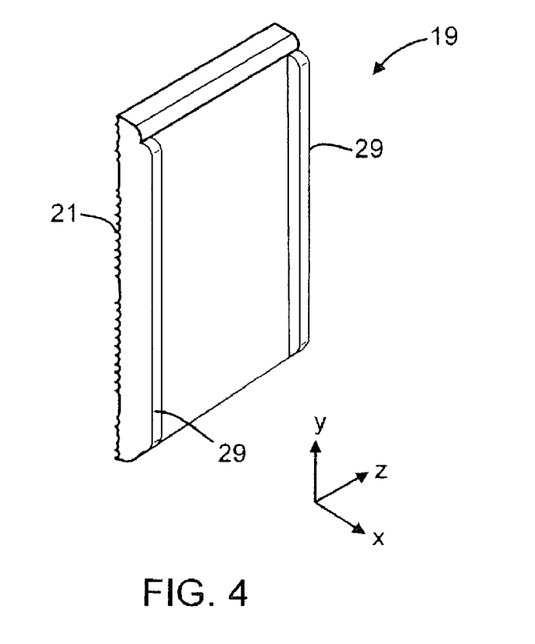
FIG. 4 illustrates a side wall spacer in one exemplary embodiment of the invention.

FIG. 3 illustrates a middle spacer, in one exemplary embodiment of the invention, and FIG. 4 illustrates a side wall spacer, in one exemplary embodiment of the invention. Referring to FIG. 3 and FIG. 4, as well as FIG. 2, the spacers 18, 19 can be variously shaped or dimensioned depending, at least in part, upon the number, configuration, and shape of the conductor strands 15, 17, and the interior size and shape of the cooling fluid box 14. Generally, the spacers 18, 19 are shaped or dimensioned to match the overall shape and dimension of columns of the conductor strands 15, 17 adjacent to which the spacers 18, 19 fit. For instance, if conductor strands 15, 17 are stacked or grouped together in columns a certain height in a y direction perpendicular to the longitude of the conductor strands 15, 17, then the spacers 18, 19 can also be that certain height in the y direction.

The width of the spacers 18, 19 in an x direction perpendicular to the y direction and perpendicular to the longitudinal extension (i.e. the z direction) of the conductor strands 15, 17 is determined by the fit of the conductor strands 15, 17 in the cooling fluid box 14. The spacers 18, 19 are wide enough to provide a tight, secure fit of the conductor strands 15, 17 in the cooling fluid box 14, prior to brazing. In a tight, secure fit of the conductor strands 15, 17 within the cooling fluid box 14, prior to brazing, a significant majority of the gap distances are equal to or less than 0.003 inches ($\approx$0.0076 cm). Over 75% of the gap distances, for instance, can be less than 0.003 inches ($\approx$0.0076 cm).

In one embodiment, the spacers 18, 19 can be wide enough to provide an interference fit before brazing, which can result in no gaps or, due to imperfections or tolerance limits of the conductor strands 15, 17, the spacers 18, 19, or the cooling fluid box 14, gaps smaller than 0.003 inches ($\approx$0.0076 cm). Then during brazing, capillary action of the brazing alloy can fill the gaps, or overcome the yield strength of the heated spacers 18, 19 and/or the heated conductor strands 15, 17 to create and fill small gaps (i.e. equal to or less than 0.003 inches ($\approx$0.0076 cm)).

In one embodiment, illustrated in FIG. 2, in which the internal space of the cooling fluid box 14 is 2.104+/−0.002 inches ($\approx$5.344+/−0.005 cm) wide (i.e. in the x direction), the middle spacers 18 are approximately 0.144 inches ($\approx$0.366 cm) wide at the narrow end (inboard end 24) in the x direction, approximately 0.166 inches ($\approx$0.422 cm) wide at the wide end (outboard end 25) in the x direction, and 2.389+/−0.001 inches ($\approx$6.068+/−0.003 cm) high (i.e. in the y direction). The side wall spacers 19 are approximately 0.242 inches ($\approx$0.615 cm) wide at the wide end (inboard end 24), approximately 0.147 inches ($\approx$0.373 cm) wide at the narrow end (outboard end 25), and also 2.389+/−0.001 inches ($\approx$6.068+/−0.003 cm) high. With the opposite tapering of the side wall spacers 19 and the middle spacers 18, the sum width of the spacers 18, 19 at any cross section in an x-y plane can be approximately equal to avoid bending the conductor strands 15, 17.

The z direction length, or the length of the spacers 18, 19 along the length of the conductor strands 15, 17, is approximately determined, at least in part, by the length of the portion of the conductor strands 15, 17 extending into the cooling fluid box 14. The length of the spacers 18, 19 in the z direction is approximately the length of the portion of the conductor strands 15, 17 extending into the cooling fluid box 14. However, depending on the tapering of the spacers 18, 19, and the fit between the conductor strands 15, 17, and the spacers 18, 19 and the cooling fluid box 14, the spacers 18, 19 can be longer or shorter than the portion of the conductor strands 15, 17 extending into the cooling fluid box 14. In one example, as shown in FIG. 2, the cooling fluid box 14 has in interior projection 28 extending approximately 1.125 inches ($\approx$2.858 cm) toward the outboard end 25 from the inboard end 24. This projection 28 reflects one industry standard length at which the conductor strands 15, 17 are extended into the cooling fluid box 14 from the inboard end 24. The spacers 18, 19 can extend approximately an additional 0.0625 inches ($\approx$0.159 cm) past the projection 28, and the conductor strands extend approximately an additional 0.125 inches ($\approx$0.318 cm) past the projection 28. In this example, the spacers 18, 19 also extend approximately 0.0625 inches ($\approx$0.159 cm) out of the cooling fluid box 14 at the inboard end 24. The total length of the spacers 18, 19 in the z direction then, is approximately 1.250 inches ($\approx$3.175 cm). The side wall spacers 19 can have lips 29 projecting from the width in the x-direction that fit on the end of either side of the projection 28 in order to help secure the side wall spacers in place during and/or after assembly.

Referring to FIG. 3 and FIG. 4, the end spacers 19 or the middle spacers 18, or both can be serrated on either or both surfaces that mate with a conductor strand 16. The spacing between serrations 21 can match the thickness of the conductor strands 15, 17, so that each serration peak can extend into the void created by the rounded corners of the conductor strands 15, 17. The serrations can reduce the gap distances and can help achieve better bridging of braze alloy from one surface to the next. A serration 21 at each end of the spacers 18, 19, where the spacers 18, 19 meet the interior of the cooling fluid box 14, can extend to help fill the additional void created by the convergence of the rounded corner of the conductor strand 15, 17 with the interior surface of the cooling fluid box 14.

The end surfaces of the spacers 18, 19 can match the interior surfaces of the cooling fluid box 14 where the end surfaces mate. For instance, the end surfaces of the middle spacers 18 can be flat to match the flat interior surfaces of the cooling fluid box 14 where the middle spacers 18 mate with the interior surfaces of the cooling fluid box 14. On the other hand, the side wall spacers 19 can be rounded on select edges to fit and mate with rounded interior edges of the cooling fluid box 14.

The conductor strands 15, 17 and the spacers 18, 19 can be brazed using a filler metal or alloy. The filler metal or alloy, due to capillary action, fills the gaps between the conductor strands 15, 17, the spacers 18, 19, and the cooling fluid box 14, making the insertion wall impervious to cooling fluid.

Figure 5:
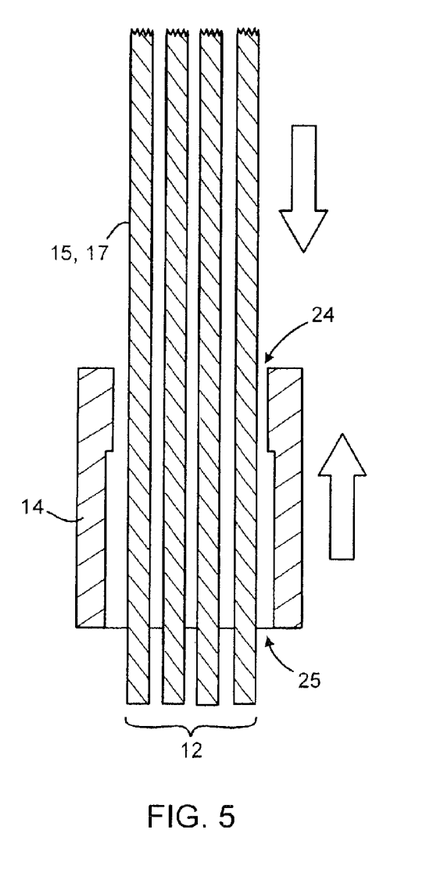
FIG. 5 is a schematic diagram illustrating a first step of assembly in one exemplary embodiment of the invention.

FIG. 5 is a schematic diagram illustrating a first step of assembly in one exemplary embodiment of the invention. To begin, the armature bar 12 and cooling fluid box 14 are separate. The cooling fluid box 14 can be placed over the armature bar 12 to approximately reach the position illustrated in FIG. 5, or at least to a point where the armature bar 12 extends far enough into and/or through the cooling fluid box 14 to enable handling and manipulation of the ends of the conductor strands 15, 17. Alternatively, the armature bar 12 can be inserted into the cooling fluid box 14, and extended far enough to enable handling and manipulation of the ends of the conductor strands 15, 17. Regardless of whether the cooling fluid box 14 moves, the armature bar 12 moves, or both the cooling fluid box 14 and the armature bar 12 move, at least one moves with respect to the other. For simplicity in describing the method from this point forward, the cooling fluid box 14 will be described as the component that moves.

Handling might require the conductor strands 15, 17 to extend all the way through the cooling fluid box 14, thereby exiting the outboard end 25 of the cooling fluid box 14. Handling, for instance, can comprise positioning the middle spacers 18 between the conductors 16, with one edge of each spacer 18 approximately aligned with the end of the conductor strands 15, 17 or aligned at a distance offset from the end of the conductor strands 15, 17.

Figure 6:
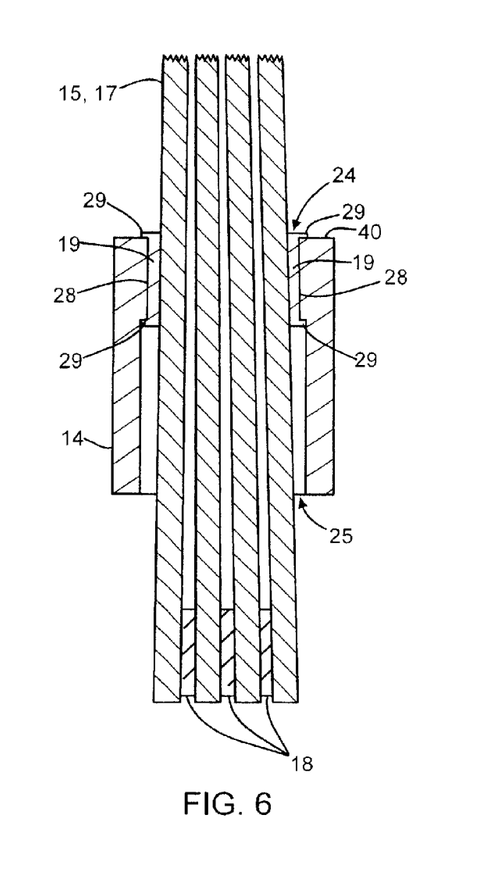
FIG. 6 is a schematic diagram illustrating a second step of assembly in one exemplary embodiment of the invention.

FIG. 6 is a schematic diagram illustrating another step of assembly in one exemplary embodiment of the invention. Once the cooling fluid box 14 is moved over the conductor strands 15, 17, the middle spacers 18 can be placed between the conductor strands 15, 17, with the narrow end of the spacers 18 closer to the inboard end 24 of the cooling fluid box 14. Each side wall spacer 19 can also be placed into position against the respective interior side wall of the cooling fluid box 14, with the tapers in the opposite direction of the middle spacers 18 (e.g. with the narrow end of the side wall spacers 19 toward the outboard end 25 of the cooling fluid box 14), and with one edge approximately aligned with the inboard end wall 40 of the cooling fluid box 14, or aligned at a distance offset from the inboard end wall 40 of the cooling fluid box 14. The alignment can occur as a product of the lip(s) 29 of each side wall spacer 19 mating with the protrusion 28 of the cooling fluid box 14. Alternately, the side wall spacers 19 can be placed into position against the interior side walls of the cooling fluid box 14 before the cooling fluid box 14 is moved over the armature bar 12.

The armature bar 12, without the middle spacers placed between the conductor strands 15, 17, is narrow enough to fit easily in and through the cooling fluid box 12, whether the side wall spacers 19 are in place within the cooling fluid box 14 or not. However, once the spacers 18, 19 are in place, as illustrated in FIG. 6, the armature bar 12 is too wide to allow the cooling fluid box 14 to be withdrawn from around the armature bar 12. The cooling fluid box 14, along with the side wall spacers 19, can be withdrawn as if to be removed from around the armature bar 12, but the conductor strands 15, 17 along with the middle spacers 18 are wedged between the side wall spacers 19 in the cooling fluid box 14, which places the armature bar 12 and cooling fluid box 14 into the position illustrated in FIG. 2 and described above. In other words, in the final position, the conductor strands 15, 17, the middle spacers 18, and the side wall spacers 19 are wedged between opposing walls of the cooling fluid box 14. In this final, wedged position, a significant majority of the gaps, such as over 75%, can have distances smaller than 0.003 inches (≈0.0076 cm). The conductor strands 15, 17 and the spacers 18, 19 can then be brazed, as described above. In one embodiment, the spacers 18, 19 and the conductor strands 15, 17 can be wedged tightly enough before brazing that a significant majority of the potential gaps are eliminated. Essentially, the spacers 18, 19 and the conductor strands 15, 17 can be wedged to create an interference fit. In this embodiment, gaps that might remain can be caused by imperfections or tolerance limits in the conductor strands 15, 17, the spacers 18, 19, the cooling fluid box 14, tools used in the assembly process, or other imperfections. Then during brazing, capillary action of the brazing alloy can fill the gaps, or overcome the yield strength of the heated spacers 18, 19 and/or the heated conductor strands 15, 17 to create and fill small gaps (i.e. equal to or less than 0.003 inches (≈0.0076 cm)).

Figure 7:
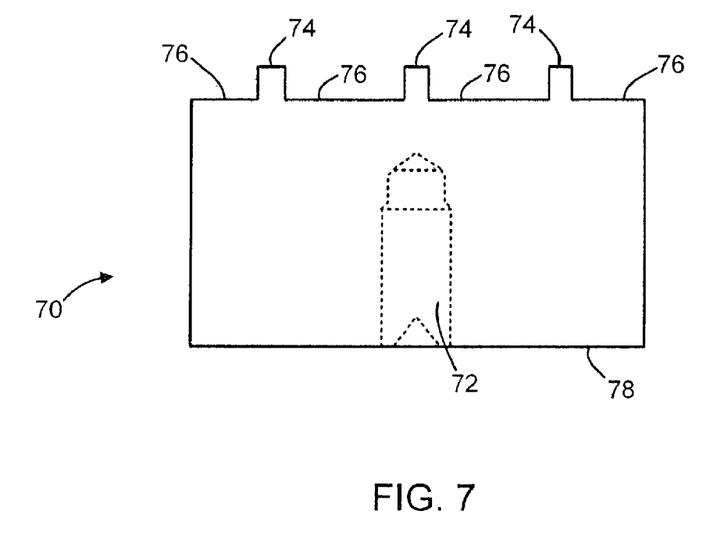
FIG. 7 illustrates an alignment block in one exemplary embodiment of the invention.
Figure 8:
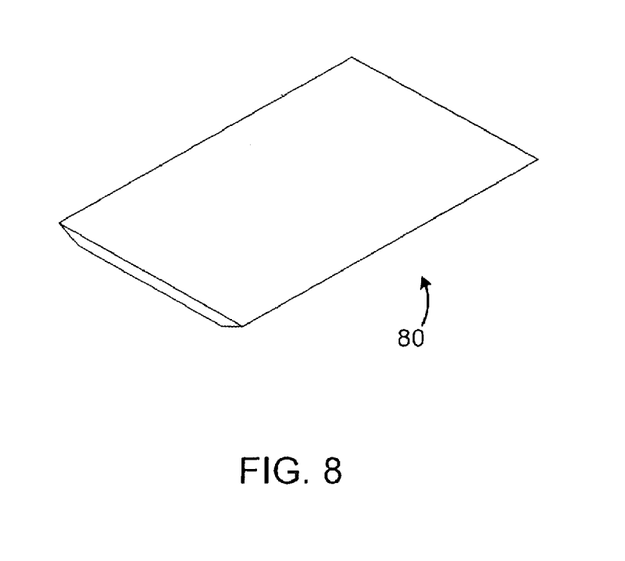
FIG. 8 illustrates a puller in one exemplary embodiment of the invention.
Figure 9:
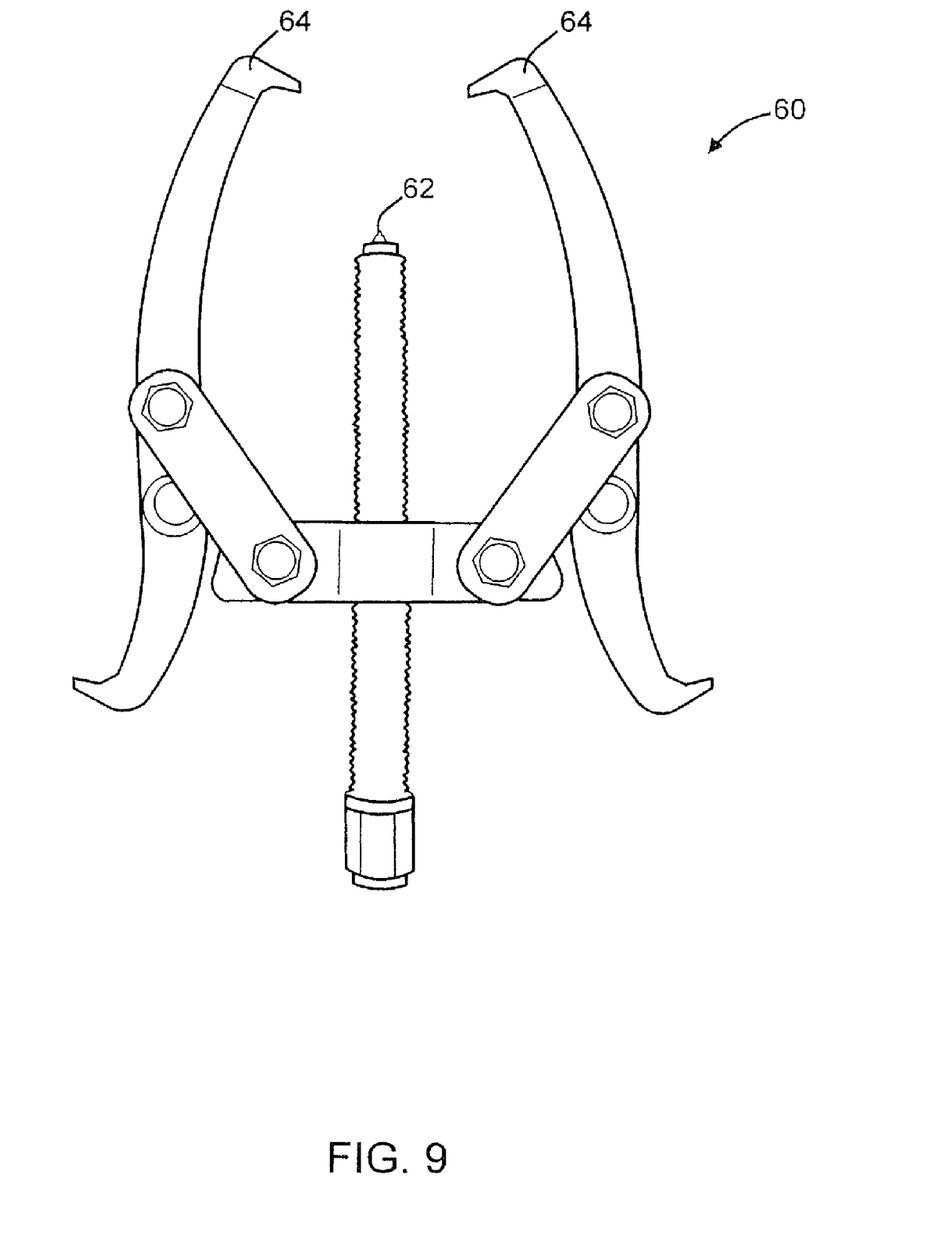
FIG. 9 illustrates a clip shoe in one exemplary embodiment of the invention.

FIGS. 7, 8, and 9 illustrate tools that can be used to assist in assembling the conductor strands 15, 17 and spacers 18 within the cooling fluid box 14. In one embodiment, to move the conductor strands 15, 17 and the middle spacers 18 into the final position illustrated in FIG. 2, the cooling fluid box 14 is pulled so that the conductor strands 15, 17 move with respect to the cooling fluid box 14 in the direction from which the conductor strands 15, 17 entered the cooling fluid box 14. A puller 60 and alignment tools can be used to pull the cooling fluid box 14 into position with the conductor strands 15, 17.

The alignment tools can comprise a strand alignment block 70 and a clip shoe 80. FIG. 7 illustrates an alignment block, in one exemplary embodiment of the invention. Referring to FIG. 8, the alignment block 70 is sized to fit inside the cooling fluid box 14 and press against the surface of every conductor strand 15, 17 and every middle spacer 18. The block 70 can have one or more spacer alignment protrusions 74. The block 70 fits on the end of the conductor strands 15, 17, so a mating surface 76 of the block 70 can press against the conductor strands 15, 17, and the spacer alignment protrusions 74 can press against the middle spacers 18. The spacer protrusions 74 offset the middle spacers 18 from the conductor strands 15, 17. Alternatively, the mating surface 76 can have no spacer protrusions 74, or the spacer protrusions 74 can be spacer indentations, which offset the middle spacers 18 in the opposite direction from the offset created by the spacer protrusions 74. The alignment block 70 has a hole 72 drilled at or approximately at the center of an outboard surface 78 of the block 70. The hole 72 is large enough to accept a screw or pin from the puller 60.

FIG. 8 illustrates the puller in one exemplary embodiment of the invention. The puller 60 can be a standard puller, with a screw pin 62 and two fingers 64. The screw pin 62 fits into the hole 72 and the fingers 64 wrap around the cooling fluid box 14. Through screwing action, the puller 62 pulls the cooling fluid box 14 or pushes the block 70, the conductor strands 15, 17, and the middle spacers 18 into position in the cooling fluid box 14.

FIG. 9 illustrates a clip shoe, in one exemplary embodiment of the invention. The clip shoe 80 can be used on the top side and/or the bottom side of the armature bar 12, where no side wall spacers 19 are positioned, between the armature bar 12 and the cooling fluid box 14. The clip shoe 80 is placed on the top and/or the bottom side of the end of the armature bar 12 (e.g. the ends of the conductor strands 15, 17) while the end of the armature bar 12 is pulled or pushed into final position for brazing. The clip shoe 80 helps align the end of the armature bar 12 in the y-direction during final positioning.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A brazed joint between an armature bar and a cooling fluid box, the joint comprising:
    a cooling fluid box with an inboard end, an opposing outboard end, a first side wall, and a second side wall, the first side wall opposing the second side wall;

a plurality of conductor strands extending into the inboard end of the cooling fluid box, wherein the plurality of conductor strands are arranged in a plurality of columns;

at least one side wall spacer wedged between the plurality of conductor strands and at least one of the first side wall and the second side wall, wherein the at least one side wall spacer has a first tapered width that tapers in a direction from the inboard end of the cooling fluid box toward the outboard end of the cooling fluid box; and at least one middle spacer wedged between at least a first column of the plurality of conductor strands and a second column of the plurality of conductor strands, wherein the at least one middle spacer has a second tapered width that tapers in a direction from the outboard end of the cooling fluid box toward the inboard end of the cooling fluid box.

2. The brazed joint of claim 1, wherein at least one from the plurality of conductor strands is hollow.

3. The brazed joint of claim 1, wherein at least one from the plurality of conductor strands is solid.

4. The brazed joint of claim 1, wherein the at least one side wall spacer has at least one protrusion along at least a portion of an edge, wherein the at least one protrusion interacts with a second protrusion on at least one of the first side wall and the second side wall to inhibit movement in a direction toward at least one of the inboard end and the outboard end.

5. The brazed joint of claim 1, wherein at least one from the group consisting of the at least one side wall spacer and the at least one middle spacer is serrated on at least one surface to reduce void spaces.

6. The brazed joint of claim 1, wherein a braze alloy fills a substantial portion of the void spaces between the conductor strands in the plurality of conductor strands, between the plurality of conductor strands and the at least one middle spacer, between the plurality of conductor strands and the at least one side wall spacer, between the at least one side wall spacer and the cooling fluid box, and between the plurality of conductor strands and the cooling fluid box, in order to seal the joint and make it impervious to cooling fluid penetration or leaks.

7. The brazed joint of claim 1, wherein a summation of the amount the first tapered width of all the side wall spacers taper approximately equals a summation of the amount the second tapered widths of all the middle spacers taper.

8. The brazed joint of claim 1, wherein a first taper angle characterizes each first tapered width, a second taper angle characterizes each second tapered width, and a summation of the first taper angles of all the side wall spacers equals a summation of the second taper angles of all the middle spacers, in order to reduce a deviation of each of the conductor strands in the plurality of conductor strands from parallel with each of the other conductor strands in the plurality of conductor strands.

9. The brazed joint of claim 1, wherein the at least one middle spacer comprises at least one and at most two central middle spacers, and a plurality of peripheral middle spacers, with an equal number of peripheral middle spacers from the plurality of peripheral middle spacers on two opposing sides of the at least one and at most two central middle spacers, the first tapered width of each side wall spacer tapering at a greater angle than the second tapered width of each peripheral middle spacer and the second tapered width of each of the at least one and at most two central middle spacers, and the second tapered width of each peripheral middle spacer tapering at a greater angle than the second tapered width of each of the at least one and at most two central middle spacers.

10. A method of forming a brazed joint between an armature bar and a cooling fluid box, the method comprising the steps:

moving the cooling fluid box, with respect to a plurality of conductor strands, around the plurality of conductor strands, so the plurality of conductor strands enters through a first end of the cooling fluid box;

positioning at least one tapered side wall spacer against at least one interior surface of the cooling fluid box;

positioning at least one tapered middle spacer between at least two conductor strands from the plurality of conductor strands;

withdrawing the cooling fluid box and the at least one tapered side wall spacer, with respect to the plurality of conductor strands, to a final position at which the plurality of conductor strands, the at least one middle spacer, and the at least one side wall spacer are wedged between the at least one interior surface and at least one opposing interior surface of the cooling fluid box opposite the at least one interior surface.

11. The method of claim 10, comprising the further step of brazing the plurality of conductor strands, the at least one middle spacer, and the at least one side wall spacer to the cooling fluid box to obtain a more permanent and fluid-impermeable joint.

12. The method of claim 10, wherein at least one conductor strand from the plurality of conductor strands is hollow.

13. The method of claim 10, wherein at least one conductor strand from the plurality of conductor strands is solid.

14. The method of claim 10, wherein the at least one tapered side wall spacer has at least one lip protruding along at least a portion of an edge, wherein the at least one lip contacts a protrusion on the at least one interior surface of the cooling fluid box to inhibit movement of the at least one tapered side wall spacer out of position.

15. The method of claim 10, wherein the step of moving the cooling fluid box around the plurality of conductor strands further comprises moving the cooling fluid box with respect to the plurality of conductor strands so the plurality of conductor strands exits the cooling fluid box through an opposing end of the cooling fluid box.

16. The method of claim 10, wherein the at least one tapered middle spacer tapers in a direction generally opposite the direction the at least one tapered side wall spacer tapers.

17. The method of claim 10, wherein withdrawing the cooling fluid box is accomplished by positioning an alignment apparatus on the plurality of conductor strands and pulling the cooling fluid box so the at least one tapered side wall spacer moves toward the at least one tapered middle spacer.

18. The method of claim 17, wherein the alignment apparatus comprises a block with a drilled hole, and at least one projection, each projection spaced to align with each of the at least one middle spacers.

19. The method of claim 10, wherein at the final position, gap distances between the at least one tapered middle spacer and each adjacent conductor strand, gap distances between the at least one tapered side wall spacer and each adjacent conductor strand, and gap distances between the at least one tapered side wall spacer and the at least one interior surface of the cooling fluid box, are smaller than 0.003 inches (0.0076 centimeters).

20. The method of claim 10, wherein at the final position, gap distances between the at least one middle spacer and the cooling fluid box, gap distances between the cooling fluid box and each adjacent conductor strand, and gap distances between the at least one side wall spacer and the cooling fluid box, are smaller than 0.003 inches (0.0076 centimeters).

* * * * *